3,655,704
PROCESS FOR THE PREPARATION OF ZINC ALKYL ORTHOPHOSPHATES
Paul David Sherman, Calumet City, and Frank J. Chloupek, South Holland, Ill., assignors to Atlantic Richfield Company, New York, N.Y.
No Drawing. Filed Jan. 28, 1970, Ser. No. 6,601
Int. Cl. C07f 3/06
U.S. Cl. 260—429.9                          10 Claims

ABSTRACT OF THE DISCLOSURE

An improved process for the manufacture of zinc alkyl orthophosphates is disclosed. Phosphorus pentoxide is reacted with an aliphatic alcohol containing from about 10 to 14 carbon atoms, such as tridecyl alcohol, in the presence of an aromatic solvent and the resulting orthophosphate ester is neutralized using a solid zinc salt such as zinc carbonate or zinc acetate, in amounts of at least about 50%, up to about 85%, preferably 70% to 80%, of the zinc required to fully neutralize the esters. The zinc alkyl orthophosphates are useful as additives in gasolines.

---

The present invention relates to an improved process for the manufacture of zinc alkyl orthophosphate ester salts. In particular, the present invention relates to a method for preparing zinc alkyl orthophosphate esters by reacting an aliphatic alcohol of about 10 to 14 carbon atoms with phosphorus pentoxide in an aromatic solvent, thereby forming an alkylphosphate ester, and reacting the resulting orthophosphate ester with a solid zinc salt in amounts of about 85% or less of the moles of zinc needed to neutralize the acid sites of the phosphate ester.

Zinc organo orthophosphates are known surfactants and deposit modifiers when used in fuels for gasoline engines. For example, in U.S. Pat. 3,481,717, issued Dec. 2, 1969, there is disclosed and claimed an improved gasoline composition which consists essentially of hydrocarbon gasoline, an anti-knock quantity of a tetra-lower-alkyl-lead compound, a gasoline-soluble zinc organo phosphate salt and gasoline-soluble phosphorus compound. These zinc organo orthophosphate salts when used with other gasoline-soluble organo phosphorus compounds such as cresyl diphenyl phosphate have been found to improve octane requirement increase, rumble and spark plug fouling in engines. As noted in the aforesaid U.S. Pat. 3,481,717, these zinc additives can be incorporated along with other known additives such as tetra-lower alkyl lead compounds.

Typically, the zinc organo phosphates are prepared by reacting an alcohol with phosphorus pentoxide in a solvent forming an organo orthophosphate ester. The alcohol is generally an aliphatic, including cycloaliphatic, alcohol, and preferably can be an alkanol, straight or branched-chain, or an alkyl-substituted phenol whose alkyl substituents contain up to about 18 carbon atoms. These esters are then reacted with a zinc salt to prepare the zinc organo orthophosphate additives. It has been found, however, that the preparation of these additives has been hampered by emulsion formation and product instability during the process of manufacture. The zinc additives prepared were also reactive over water, a condition which precluded their use in gasoline. These compounds decomposed at gasoline-water interfaces in storage tanks forming a precipitate that causes filter plugging.

It has now been found that relatively stable, water-unreactive zinc alkyl orthophosphate additives suitable for use in gasoline can be prepared by reacting phosphorus pentoxide with an alkanol containing from about 10 to 14 carbon atoms, preferably 12 to 13 carbon atoms, in an aromatic solvent to form an alkyl orthophosphate ester and reacting the resulting ester with a reactive, solid zinc salt of an inorganic or an organic acid, preferably a form of zinc carbonate or zinc acetate, the zinc salt being present in an amount sufficient to provide up to about 85% and at least about 50%, preferably about 70 to 80%, of the number of moles of zinc needed to neutralize the acid sites of the phosphate ester.

The reaction of the aliphatic alcohol and phosphorus pentoxide to prepare the partial esters can be conducted at temperatures of about 100° F. to 250° F., preferably about 130° F. to 200° F., for a period of time sufficient to effect substantially complete reaction, usually about 1 to 15 hours. The reaction is carried out in the presence of an inert, liquid, essentially aromatic hydrocarbon solvent, generally boiling in the gasoline range or higher, e.g., at least 50% or more boiling in the gasoline range, preferably at least about 75% or 80%, in an amount sufficient to dissolve the zinc salt formed by the partial neutralization. Toluene, xylene and mixed hydrocarbon solvents composed predominantly of aromatics are preferred solvents and it has been found that paraffinic solvents may yield unstable products. A suitable molar ratio of alkanol to phosphorus pentoxide can be from about 1 to 6:1, preferably about 2 to 4:1.

The zinc alkyl orthophosphate ester salt additives are prepared by reacting the resulting ester with a solid zinc salt of an inorganic or organic acid, such as zinc chloride, zinc sulfate, zinc carbonate, basic zinc carbonate $(Zn_5(CO_3)_2—(OH)_6)$, or zinc acetate, with the zinc salt being present in amounts sufficient to provide at least about 50% and up to about 85%, preferably 70 to 80%, of the equivalent number of moles of zinc needed to neutralize the acid sites of the phosphate ester. Zinc acetate and zinc carbonates are preferred as is the essential absence of added water in the neutralization.

The partially-neutralized zinc salts of this invention can be incorporated into a gasoline composition consisting essentially of a hydrocarbon gasoline, and anti-knock quantity of a tetra-lower alkyl-lead compound, such as tetraethyl lead and a gasoline soluble phosphorous compound having the formula:

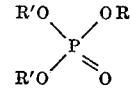

where R is a lower alkyl phenyl radical of 7 to 15 carbon atoms and R' is selected from the group consisting of phenyl and R. The zinc salts of this invention can be present in the gasoline compositions in a small but effective amount sufficient to improve octane requirement increase, rumble and spark plug fouling, which amount can be, for example, from about 0.025 to 0.3 milligram atom of metal per gallon of the gasoline. The gasoline soluble phosphorous compound is preferably cresyl diphenyl phosphate and can be present in an amount of from about 0.05 to 0.5 theory, preferably about 0.2 to 0.3 theory, based on the lead content of the gasoline. The term "theory" as applied to the gasoline soluble organophosphate additive means the amount required to react stoichiometrically with the lead so that all of the lead atoms and all of the phosphorous atoms form $Pb_3(PO_4)_2$.

The following example demonstrates the process of the present invention.

EXAMPLE

Zinc organo orthophosphates were prepared by reacting phosphorus pentoxide with different alcohols and then reacting the resulting product with basic zinc carbonate and zinc acetate in varying equivalent concentrations. Products which were suitably formed by the reaction were subjected to a test to duplicate field storage stability.

Field tank storage stability was simulated by storing a commercial type leaded gasoline with the additive at 100° F. for 30 days over water bottoms with a pH of 6, 7 or 8. The ratio of gasoline to water was 9 to 1. The conditions and amounts of preparation are shown below in Table I. Table II shows the effect of concentration of zinc on the preparation of the additive. Table III shows the effects of the solvent present during the reaction on the stability of the product. Table IV shows the effect of the concentration of zinc on the stability of the products. Table V shows the effect of different alcohols on product stability and Table VI shows the results of the storage stability tests on the products formed.

As may be noted from the tables, zinc carbonate yields a slightly more stable product than zinc acetate at 100% of equivalent zinc concentration. At 80% of equivalence (number of moles of zinc needed to neutralize the acid sites of the phosphates ester) either zinc salt is acceptable. The paraffinic solvent used in Runs 19 and 20 yielded an unstable product while the aromatic solvent yielded a stable product. Although isodecanol also formed a stable product without problems in preparation, Table VI shows that this additive was more unstable in the storage stability test. Zinc tridecyl orthophosphate showed even better storage stability than the base fuel without any zinc additive.

TABLE I

| Run number | Preparation |
|---|---|
| 1 | Phosphorus pnentoxide (.3 mole) was reacted with 154 m isodecanol (.9 mole) in a round bottom flask using 320 ml. of 140 aromatic solvent. The mixture was stirred at 185° F. for one and one-half hours. The product, isodecyl orthophosphate was washed three times with hot water (185° F.). Basic zinc carbonate (.225 mole, 100% equivalence of the ester acid sites) was added to the ester and stirred at 185° F. for one and one-half hours. The product was washed with three hot water washes, and filtered. |
| 2 | Preparation was identical to Run 1 except 25% less equivalence basic zinc carbonate was used and the reaction was run with 150 ml. of water added. |
| 3 | Preparation was identical to Run 1 except 5% less equivalence basic $ZnCO_3$ was used. |
| 4 | Same basic procedure as Run 1 except cold water washes were used. |
| 5 | Same procedure as Run 1 except 5% excess equivalence basic zinc carbonate was used. |
| 6 | Same as Run 1 except .225 mole zinc acetate was used (100% equivalent). |
| 7 | Same as Run 1 except 30% less equivalence basic zinc carbonate was used. |
| 8 | Same as Run 1 except 20% less equivalence basic zinc carbonate was used. |
| 9 | Same as Run 1 except 10% less equivalence basic zinc carbonate was used. |
| 10 | Same as Run 1 except 30% less equivalence basic zinc carbonate was used with 150 ml. of water added. |
| 11 | Same as Run 1 except 10% excess equivalence basic zinc carbonate was used. |
| 12 | Same as Run 1 except toluene was used as the solvent. |
| 13 | Same as Run 1 except the basic zinc carbonate was added over 30 minutes. |
| 14 | Same as Run 1 except 30% less equivalence basic zinc carbonate was used along with tridecanol instead of isodecanol. |
| 15 | Same as Run 1 except zinc acetate was used with 20% less mole equivalence. |
| 16 | Same as Run 1 except 15-20% less equivalence basic zinc carbonate was used and added by slow addition over 20 minutes. |
| 17 | Same as Run 1 except 20% less equivalence basic zinc carbonate was used and octyl alcohol was substituted for isodecanol. |
| 18 | Same as Run 1 except 20% less equivalence basic zinc carbonate was used and hexadecyl alcohol was substituted for isodecanol. |
| 19 | Same as Run 1 except 30% less equivalence basic zinc carbonate was reacted and water white distillate was used as the solvent. |
| 20 | Same as Run 1 except 20% less equivalence basic zinc carbonate was added slowly using water white distillate as the solvent. |

TABLE II.—EFFECTS OF ZINC SALT ON ZINC ALKYL PHOSPHATE PREPARATION

| | Zinc salt used | Zinc conc. (percent equivalent) | Preparative problems | Product stability[1] |
|---|---|---|---|---|
| Run: | | | | |
| 8 | Zinc carbonate, basic | 80 | None | Good. |
| 1 | do | 100 | Some emulsion, poor filtering | Clouded |
| 15 | Zinc acetate | 80 | None | Good. |
| 6 | do | 100 | Bad emulsion, poor filtering | Precipitate. |

[1] Clear products were rated good.

TABLE III.—EFFECTS OF SOLVENT ON ZINC ALKYL PHOSPHATE PREPARATION

| | Solvent | Zinc conc. (of equivalent), percent | Preparative problems | Product stability[1] |
|---|---|---|---|---|
| Run: | | | | |
| 7 | 140 Aromatic[2] | 70 | None | Good. |
| 4 | do.[2] | 100 | Bad emulsion, poor filtering | Precipitate forms. |
| 20 | Water white dist.[3] | 80 | Some emulsion | Do. |
| 19 | do.[3] | 70 | None | Do. |
| 12 | Toluene | 100 | do | Do. |

[1] Clear products were rated good.
[2] 140 Aromatic is a high, e.g. about 95% or more, aromatic content hydrocarbon solvent having an API gravity of 29.5, an initial boiling point of about 360° F. and an end boiling point of about 395° F.
[3] Water white distillate is a paraffinic-type hydrocarbon solvent.

TABLE IV.—EFFECT OF ZINC CONCENTRATION ON ZINC PHOSPHATE PREPARATION

| | Percent equivalent basic $ZnCO_3$ used | Preparative problems | Product stability[1] |
|---|---|---|---|
| Run: | | | |
| 10 | 70 | None | Precipitate forms. |
| 7 | 70 | do | Good. |
| 2 | 75 | do | Precipitate forms. |
| 8 | 80 | do | Good. |
| 9 | 90 | do | Precipitate forms. |
| 3 | 95 | Bad emulsion, poor filtering | Do. |
| 4 | 100 | do | Do. |
| 1 | 100 | do | Do. |
| 13 | 100 | do | Do. |
| 5 | 105 | do | Do. |
| 11 | 110 | do | Do. |

[1] Clear products were rated good.

TABLE V.—EFFECT OF DIFFERENT ALCOHOLS ON ZINC ALKYL PHOSPHATE PREPARATION

| Alcohol | | Percent equivalent Zn | Preparative problems | Product stability [1] |
|---|---|---|---|---|
| Run: | | | | |
| 8 | Isodecanol | 80 | None | Good. |
| 17 | Octanol | 80 | do | Heavy precipitate formed. |
| 18 | Hexadecanol | 80 | Bad emulsion in ester formation. | No product. |
| 14 | Tridecanol | 70 | None | Good. |

[1] Clear products were rated good.

TABLE VI.—STORAGE STABILITY OF ZINC ALKYL PHOSPHATE

| Characteristics | | Interface evaluations | | |
|---|---|---|---|---|
| | | pH 6 | pH 7 | pH 8 |
| Run: | | | | |
| 7 | 30% less ZnCO₃, isodecyl alcohol | Trace | Trace | Trace. |
| 8 | 20% less ZnCO₃, isodecyl alcohol | Fail | do | Do. |
| 9 | 10% less ZnCO₃, isodecyl alcohol | do | Fail | Fail. |
| 14 | 30% less ZnCO₃, tridecyl alcohol | OK | Trace | OK. |
| Base | No additives | Trace | do | Trace |

It is claimed:

1. A process for the manufacture of a zinc alkyl orthophosphate which comprises reacting an alkanol containing from about 10 to 14 carbon atoms and phosphorus pentoxide in an aromatic hydrocarbon solvent at a temperature of from about 100 to 250° F. for a time sufficient to form the corresponding alkyl phosphate ester and reacting the resulting ester with a solid zinc salt in an amount sufficient to provide from about 50% to 85% of the moles of zinc needed to fully neutralize the acid sites of the phosphate ester.

2. The process of claim 1 wherein the zinc salt is present in an amount of from about 70% to 80% of the moles of zinc needed to fully neutralize the acid sites of the phosphate ester.

3. The process of claim 2 wherein the zinc salt is zinc acetate or zinc carbonate.

4. The process of claim 3 wherein the process is carried out at a temperature of from about 130 to 200° F.

5. The process of claim 1 wherein the molar ratio of alkanol to phosphorous pentoxide is from about 1 to 6:1.

6. The process of claim 5 wherein the molar ratio of alkanol to phosphorus pentoxide is from about 2 to 4:1.

7. The process of claim 5 wherein the alkanol contains 12 to 13 carbon atoms.

8. The process of claim 7 wherein the alkanol is tridecyl alcohol.

9. The process of claim 6 wherein the alkanol contains 12 to 13 carbon atoms.

10. The process of claim 7 wherein the alkanol is tridecyl alcohol.

References Cited

UNITED STATES PATENTS

| 3,401,184 | 9/1968 | Revukas | 260—429.9 X |
| 2,790,766 | 4/1957 | Otto | 260—429.9 X |
| 2,193,965 | 3/1940 | Hochwalt | 260—980 X |
| 2,676,975 | 4/1954 | Fortess et al. | 260—980 |
| 2,586,897 | 2/1952 | Woodstock | 260—980 X |

TOBIAS E. LEVOW, Primary Examiner

H. M. S. SNEED, Assistant Examiner

U.S. Cl. X.R.

260—980, 987